US008839098B2

(12) United States Patent
Halahmi

(10) Patent No.: US 8,839,098 B2
(45) Date of Patent: Sep. 16, 2014

(54) SYSTEM AND METHOD FOR RAPID DOCUMENT CONVERSION

(75) Inventor: Erez Halahmi, Petah Tikva (IL)

(73) Assignee: BlackBerry Limited, Waterloo (CA)

( * ) Notice: Subject to any disclaimer, the term of this patent is extended or adjusted under 35 U.S.C. 154(b) by 358 days.

(21) Appl. No.: 13/329,820

(22) Filed: Dec. 19, 2011

(65) Prior Publication Data

US 2012/0131449 A1 May 24, 2012

Related U.S. Application Data

(63) Continuation of application No. 10/204,757, filed as application No. PCT/IL01/00190 on Feb. 28, 2001, now Pat. No. 8,122,344.

(51) Int. Cl.
*G06F 17/00* (2006.01)
*G07F 15/00* (2006.01)

(52) U.S. Cl.
CPC .................................... *G07F 15/00* (2013.01)
USPC .......................................................... 715/249

(58) Field of Classification Search
CPC ........................... G06F 17/2264; G06F 17/212
USPC ................................................. 715/249, 273
See application file for complete search history.

(56) References Cited

U.S. PATENT DOCUMENTS

| | | | | | |
|---|---|---|---|---|---|
| 5,778,372 | A | | 7/1998 | Cordell et al. | |
| 5,781,901 | A | | 7/1998 | Kuzma | |
| 5,845,084 | A | | 12/1998 | Cordell et al. | |
| 5,895,476 | A | * | 4/1999 | Orr et al. | 715/202 |
| 5,907,837 | A | | 5/1999 | Ferrel et al. | |
| 6,098,085 | A | * | 8/2000 | Blonder et al. | 715/208 |
| 6,148,311 | A | * | 11/2000 | Wishnie et al. | 715/205 |
| 6,191,786 | B1 | * | 2/2001 | Eyzaguirre et al. | 715/853 |

(Continued)

FOREIGN PATENT DOCUMENTS

| | | |
|---|---|---|
| CA | 2401444 | 9/2001 |
| EP | 0186007 | 7/1986 |

(Continued)

OTHER PUBLICATIONS

Fox, A., "Adapting to Network and Client Variability via On-Demand Dynamic Distillation," ACM, Architectural Support for Programming Languages and Operating Systems, Oct. 1996, pp. 160-170.*

(Continued)

*Primary Examiner* — Laurie Ries
(74) *Attorney, Agent, or Firm* — The Danamraj Law Group, P.C.

(57) ABSTRACT

In one embodiment, a method of providing a modular document for display on a wireless communication device is disclosed. The method comprises receiving a request for the modular document from the wireless communication device for display thereon; requesting the document from a document server; retrieving user preferences for display of at least a portion of the modular document; receiving at a conversion server at least a part of the modular document requested for display, the modular document comprising a plurality of modules, wherein at least one format module is inter-related with at least one text module; locating a set of modules for conversion; converting the modular document into a converted file format by the conversion server for display according to the user preferences; and transmitting the converted file format to the wireless communication device for display thereon.

20 Claims, 5 Drawing Sheets

(56) References Cited

U.S. PATENT DOCUMENTS

| | | | | |
|---|---|---|---|---|
| 6,250,309 | B1 * | 6/2001 | Krichen et al. | 128/899 |
| 6,272,190 | B1 * | 8/2001 | Campana, Jr. | 375/347 |
| 6,374,402 | B1 * | 4/2002 | Schmeidler et al. | 717/167 |
| 6,549,916 | B1 * | 4/2003 | Sedlar | 1/1 |
| 6,684,088 | B1 | 1/2004 | Halahmi | |
| 6,727,916 | B1 * | 4/2004 | Ballard | 715/758 |
| 6,925,595 | B1 | 8/2005 | Whitledge et al. | |
| 7,017,162 | B2 * | 3/2006 | Smith et al. | 719/328 |
| 7,136,925 | B1 * | 11/2006 | Eerola | 709/228 |
| 7,546,602 | B2 * | 6/2009 | Hejlsberg et al. | 719/313 |
| 2001/0003846 | A1 * | 6/2001 | Rowe et al. | 725/47 |
| 2001/0044805 | A1 * | 11/2001 | Multer et al. | 707/201 |
| 2002/0010758 | A1 * | 1/2002 | Chan | 709/218 |
| 2002/0015042 | A1 * | 2/2002 | Robotham et al. | 345/581 |
| 2002/0040366 | A1 * | 4/2002 | Lahr | 707/101 |
| 2002/0059459 | A1 * | 5/2002 | Koka et al. | 709/246 |
| 2002/0078154 | A1 * | 6/2002 | Djennane et al. | 709/205 |
| 2002/0129006 | A1 * | 9/2002 | Emmett et al. | 707/1 |
| 2002/0147788 | A1 | 10/2002 | Nguyen | |
| 2003/0023637 | A1 | 1/2003 | Halahmi | |
| 2004/0139396 | A1 | 7/2004 | Gelemter et al. | |

FOREIGN PATENT DOCUMENTS

| | | |
|---|---|---|
| EP | 0440510 | 8/1991 |
| JP | 05-225240 | 9/1993 |
| WO | 97/12328 | 4/1997 |
| WO | 98/41937 | 9/1998 |
| WO | 99/14909 | 3/1999 |

OTHER PUBLICATIONS

CIPO, Office Action, Application No. 2,401,444, Apr. 8, 2009, 4 pgs.

CIPO, Office Action, Application No. 2,401,444, Jan. 24, 2011, 4 pgs.

CIPO, Notice of Allowance, Application No. 2,401,444, Sep. 12, 2013, 1 pg.

EPO, Communication Pursuant to Article 96(2) A39EPC, Application No. 01908100.9, Sep. 20, 2006, 7 pgs.

EPO, Summons to Attend Oral Proceedings Pursuant to Rule 115(1) EPC, Application No. 01908100.9, Feb. 11, 2011, 12 pgs.

JPO, Notice of Reasons for Rejection, Application No. 2001-563985, Mar. 11, 2010, 15 pgs.

JPO, Notice of Reasons for Rejection, Application No. 2001-563985, Dec. 10, 2010, 2 pgs.

Fox et al., "Adapting to Network and Client Variability Via On-Demand Dynamic Distillation", ACM Architectural Support for Programming Languages and Operating Systems, Oct. 1996, pp. 160-170.

Ma et al., "A Framework for Adaptive Content Delivery in Heterogeneous Network Environments", Proceedings of SPIE, vol. 3969, Jan. 24, 2000, pp. 86-100.

Smith et al., "Transcoding Internet Content for Heterogeneous Client Devices", 1998 IEEE, IBM, TJ. Watson Research Center.

* cited by examiner

SYSTEM AND METHOD FOR RAPID DOCUMENT CONVERSION

CROSS REFERENCE TO RELATED APPLICATION

This application is a continuation application claiming the benefit of the following prior U.S. patent application Ser. No. 10/204757 entitled "SYSTEM AND METHOD FOR RAPID DOCUMENT CONVERSION", filed Aug. 23, 2002, the entire contents of which are incorporated herein by reference.

FIELD AND BACKGROUND OF THE INVENTION

The present invention relates to a system and method for the rapid, automatic conversion of documents, and in particular, for a system and method which converts such documents in a streamed manner, for example for transmission and display by a WAP (wireless application protocol) enabled device.

Cellular telephones are becoming increasingly popular for portable telephone use, particularly for users who are interested in rapid, mobile communication. As the amount of computational power and memory space which are available in such small, portable electronic devices becomes increased, a demand has arisen for different types of communication services through such devices. In particular, users have demanded that cellular telephones receive many different types of multimedia data, including e-mail (electronic mail) messages and Web pages.

In response to such demands, and to extend the power and efficacy of operation of portable, wireless electronic communication devices, the WAP (wireless application protocol) de facto standard has been developed. WAP is now the standard for the presentation and delivery of wireless data, including multimedia and other information, and telephony services, on mobile telephones and other types of wireless communication devices. WAP is designed to efficiently provide both multimedia and telephony services to such wireless communication devices, given the limitations of wireless networks and of the electronic devices themselves.

Wireless communication devices have requirements and drawbacks which are different than cable-linked electronic devices. For example, wireless networks are frequently significantly less stable than cable networks. Since users with such portable communication devices often operate these devices at different locations, the wireless network connection may not always be available, and may even suddenly become unavailable during a single communication session. In addition, the wireless communication devices themselves are more limited in terms of available resources than desktop computers. For example, such wireless communication devices typically have a less powerful CPU (central processing unit), less memory at a lower amount of available power since these devices are often battery-operated, and smaller display screens. Thus, wireless communication devices require adaptations of existing software and data transmission protocols in order to effectively deliver multimedia content from the Internet.

WAP provides the required adaptations and modifications to such software and data transmission protocols in order to meet the requirements of wireless communication devices. For example, HTML (Hyper-text Mark-up Language) has been adapted to form WML (Wireless Mark-up Language), which provides a document mark-up language suitable for WAP-enabled devices and their corresponding limitations.

WAP-enabled devices are able to receive and display documents written in WML, thereby enabling such devices to display Web pages which are written in WML, for example.

Unfortunately bandwidth considerations still limit the amount of data which can be rapidly received by WAP-enabled devices, such as cellular telephones for example. Therefore, the user may be forced to wait for a significant period of time before an entire document is downloaded for display by the WAP-enabled device. Furthermore, the user may not even wish to view the entire document, but only a portion of such a document. If that portion is located near the end of the document, then the user must wait for data which is not of interest to be downloaded, before the portion of interest can be received by the WAP-enabled device. Also, WAP-enabled devices are not able to display file formats such as Microsoft Word™ documents.

This problem is particularly acute for documents which are not originally designed for display by a WAP-enabled device, such as files which are composed of OLE (Object Linking and Embedding) file components (Microsoft Ltd., USA). Such components, or components of other types of files, are not necessarily sequentially assembled within the file, such that each component must be examined in order to determine its relationship to other such file components, before the component can be converted to a different file format.

For example, files produced by the word processing software program, Word™ (Microsoft Ltd., USA) are actually assembled from OLE file components. Such files can be converted to text with formatting only after the relevant formatting block arrives for the text block, as the order of the formatting blocks parallels the order of the text blocks to which they refer. Therefore, the relative order of formatting and text blocks, and in particular the relationship between these blocks, must be maintained in order for the conversion to be successful. Thus, a simple solution to this problem is simply to wait until the entire file is received, and then to convert the entire file at once, thereby easily maintaining the relationship between the components.

A more useful solution would involve a "streamed" conversion, in which parts of the file are converted without waiting for the entire file to be received and/or without regard for the sequential order of the components within the file. Such a streamed conversion would enable the user to begin to receive and display the converted document in portions, without waiting for the entire document to be converted. Preferably, the user could also select a portion to be converted and viewed without regard to the location of that portion within the document, such that the user could optionally choose to view the last portion of the document before viewing other portions, for example. Such a solution would be particularly useful for low bandwidth devices such as wireless devices, since each part of the document could be downloaded to the device as soon as that part has been converted. For example, the document could be converted to WML (Wireless Markup Language) in a streamed manner, and then downloaded to, and displayed by, the WAP-enabled wireless device as soon as each part is ready. Such a solution would clearly be more efficient and would also clearly enable the user to view the document more quickly. Unfortunately, such a solution is not currently available.

There is thus a need for, and it would be useful to have, a system and a method for converting a document in a streamed manner, for example to a WAP-enabled device such as a cellular telephone, such that the device is able to receive and display at least a part of the converted document before the entire document is converted.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

Figure 1:
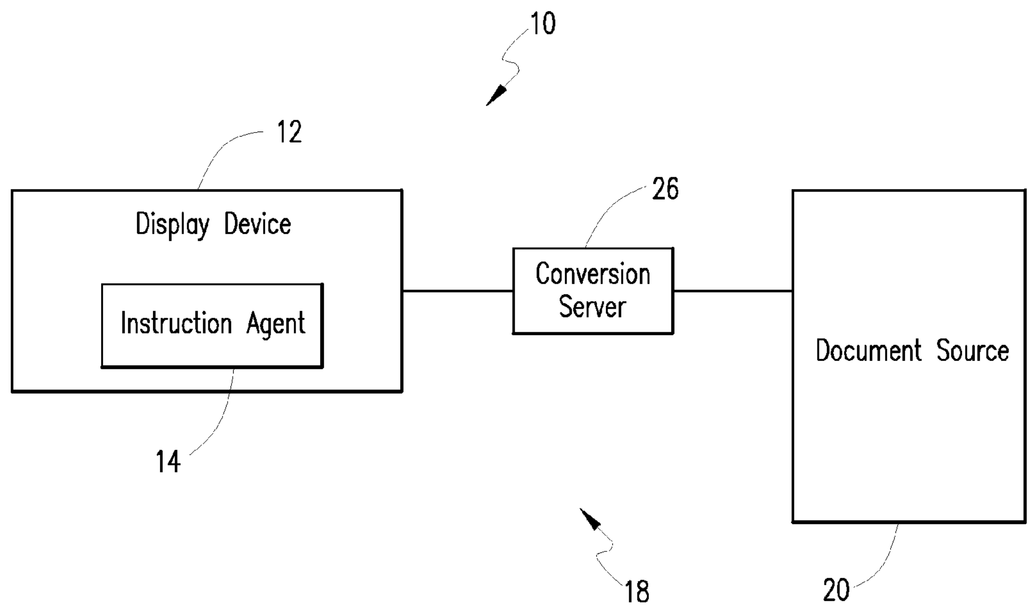
FIG. 1 is a schematic block diagram of a system according to the present invention.

The present invention is of a method and a system for converting a document in a streamed manner, for more rapid transmission and display of each part of the document as that part is converted. As described in greater detail below, the present invention is particularly useful for the conversion of documents which are based in discrete blocks with a particular relationship between the blocks, termed "modules" herein for a "modular document". Documents which are in a block format are more difficult to convert in a streamed manner, simply because the relationship between the blocks must be maintained during the conversion process. This necessitates maintaining a buffer in order to review previously examined blocks for enabling the relationship between the blocks to be preserved.

According to the present invention, there is provided a method for converting at least part of a modular document into a converted file format for display to a user, the method comprising the steps of: (a) analyzing at least a part of the modular document to form an analyzed document; (b) separating the analyzed document into a plurality of modules; (c) determining a relationship between at least a pair of modules; and (d) converting at least the pair of modules according to the relationship to form the converted file format.

According to another embodiment of the present invention, there is provided a system for converting a modular document to a converted file format for display to a user, the modular document featuring a plurality of modules having a relationship between at least a pair of modules, the system comprising: (a) a document source for serving the modular document; and (b) a conversion server for receiving the modular document and for converting at least part of the modular document into the converted file format according to the relationship between at least the pair of modules.

According to still another embodiment of the present invention, there is provided a method for converting at least part of a document into a converted file format for display to a user, the document containing data in a non-sequential order, the method comprising the steps of: (a) analyzing at least a part of the document to form an analyzed document; (b) determining an order for the data in at least a part of the document; and (c) converting at least the part of the document according to the order for the data to form the converted file format.

Hereinafter, the term "network" refers to a connection between any two electronic devices which permits the transmission of data.

Hereinafter, the term "wireless device" refers to any type of electronic device which permits data transmission through a wireless channel, for example through transmission of radio waves. Hereinafter, the term "cellular phone" is a wireless device designed for the transmission of voice data and/or other data, optionally through a connection to the PSTN (public switched telephone network) system.

Hereinafter, the term "computational device" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, cellular telephones, wearable-computers of any sort, and WAP-enabled devices, as well as any device which can be connected to a network as previously defined and which have an operating system. Hereinafter, the term "Windows™" includes but is not limited to Windows95™, Windows 3.x™ in which "x" is an integer such as "1", Windows NT™, Windows98™, Windows CE™, Windows2000™, and any upgraded versions of these operating systems by Microsoft Corp. (USA).

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extensible mark-up language}, WML (wireless mark-up language), or related computer languages thereof, as well as to any collection of such documents reachable through one specific Internet address or at one specific World Wide Web site, or any document obtainable through a particular URL (Uniform Resource Locator).

Hereinafter, the term "Web site" refers to at least one Web page, and preferably a plurality of Web pages, virtually connected to form a coherent group. Hereinafter, the term "Web server" refers to software, or a combination of hardware and software, such as a software program operated by a computational device, which is capable of transmitting at least one Web page upon request by a Web browser.

Hereinafter, the phrase "display a Web page" includes all actions necessary to render at least a portion of the information on the Web page available to the computer user. As such, the phrase includes, but is not limited to, the visual display of graphical information, the audible production of audio information, the animated visual display of animation and the visual display of video stream data.

Hereinafter, unless otherwise noted, a WML card is assumed to be similar or identical to a Web page as previously described for the purposes of describing the present invention.

The method of the present invention could be described as a series of steps performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computer hardware and operating system according to which the software application is executed. Examples of suitable programming languages include, but are not limited to, C, C++, WMLscript and Java.

DETAILED DESCRIPTION OF THE INVENTION

The present invention is of a method and a system for converting a document in a streamed manner, for more rapid transmission and display of each part of the document as that part is converted. The present invention is preferred for operation in environments with limited bandwidth and/or display capacity, such as for wireless handheld devices, for example. As previously described, such devices cannot easily receive large amounts of data, and also typically have relatively small display screens. Thus, the present invention enables the user to quickly receive and display each part of the document after being converted, rather than waiting for the entire document to be converted and then transmitted before any part is displayed.

As described in greater detail below, the present invention is particularly useful for the conversion of documents which are based in discrete blocks with a particular relationship between the blocks, termed "modules" herein for a "modular document". Documents which are already in a streamed format, such as streaming audio or video data for example, may also be converted according to the present invention, but the particular advantage of the present invention is the ability to handle documents which are not in such a streamed format. Documents which are in a block format are more difficult to convert in a streamed manner, simply because the relationship between the blocks must be maintained during the conversion process. This necessitates maintaining a buffer in order to review previously examined blocks for enabling the relationship between the blocks to be preserved.

For example, word processing documents, which may be written in either a standard or proprietary format such as that of the Word™ software program (Microsoft Ltd., USA), may be composed of separate blocks of text and formatting instructions. If the relationship between each block of text and the corresponding block of formatting instructions is not maintained, then the visual properties of the text may be either lost or corrupted. Thus, the relationship between components of a document is important for modular file formats, such as for word processing documents, in which each module can only be fully interpreted with regard to a relationship with at least one other module.

Another example of a modular document format is the MPEG (Motion Picture Expert Group) video data format, in which each frame may optionally be considered as a module, and in which intra-frames and inter-frames may each optionally be considered to be different types of modules.

For these reasons, the present invention is also particularly useful for documents which contain data in a non-sequential order, such that the conversion process depends upon determining the actual order of the data. Although a portion of the description below is explained with regard to WAP and a WAP-enabled device, such as a cellular telephone for example, it is understood that this is for the purposes of description only and is without any intention of being limiting. For a reference to WAP, as well as a more detailed explanation, see for example "Programming Applications with the Wireless Application Protocol" (S. Mann, Wiley Computer Publishing, John Wiley and Sons Inc., 1999), incorporated by reference as if fully set forth herein. Furthermore, both the display device and wireless network which are described below can be viewed as examples of a low bandwidth device and network for the purposes of the present invention.

The principles and operation of a system and a method according to the present invention may be better understood with reference to the drawings and the accompanying description, it being understood that these drawings are given for illustrative purposes only and are not meant to be limiting.

Referring now to the drawings, FIG. 1 is a schematic block diagram of a system according to the present invention for converting a modular document in a streamed manner.

A system 10 has a display device 12 for interacting with a user, which operates an instruction agent 14, such as a Web browser for example. Optionally and preferably, display device 12 could be a wireless communication device 12, which more preferably operates according to WAP. Web browsers which operate according to WAP are also referred to as "microbrowsers". Requests are sent from display device 12 through a network 18, such as a wireless network for example. As a non-limiting example, display device 12 is optionally a cellular telephone, while network 18 is optionally a cellular telephone communication channel.

The request for a document is sent from display device 12 to a document source 20, which serves modular documents such as word processing documents, for example. However, the documents provided by document source 20 need to be converted to a file format which is displayable by instruction agent 14. One example of such a file format is a WML (wireless markup language) document, or WML card, for wireless communication devices which support WAP.

In order for the modular document of document source to be converted to WML cards, or to another suitable file format, system 10 also features a conversion server 26 according to the present invention.

Conversion server 26 receives at least a part of a document from document source 20, which is preferably a modular document, and then begins to convert the modular document in a streamed manner. By "streaming", it is meant that conversion server 26 is able to begin to convert the document into the converted format as soon as a sufficient part of the document is received. This process is explained in greater detail with regard to the schematic block diagrams in FIGS. 2A-2C and the flowchart in FIG. 3 below.

Briefly, conversion server 26 analyzes the document, and then decomposes the document into its component modules according to the type of modular file format of the document. These modules are then converted in a streamed manner which is determined by the required relationship between every two or more modules, such that conversion server 26 may optionally not begin the process of converting a first module until the corresponding second module has been read, for example. More preferably, conversion server 26 includes a plurality of specific converters (not shown), each of which handles a particular type of module for the process of conversion. The minimum required collection of a plurality of modules which are required before a particular module can be converted is termed herein a "set of modules".

Optionally and preferably, as each set of modules is converted by conversion server 26 to a converted file format, the converted data is sent to display device 12. Instruction agent 14 then causes display device 12 to display the message. For example, if the converted file format is a WML deck containing a WML card, then preferably instruction agent 14 is a microbrowser.

Figure 2A:
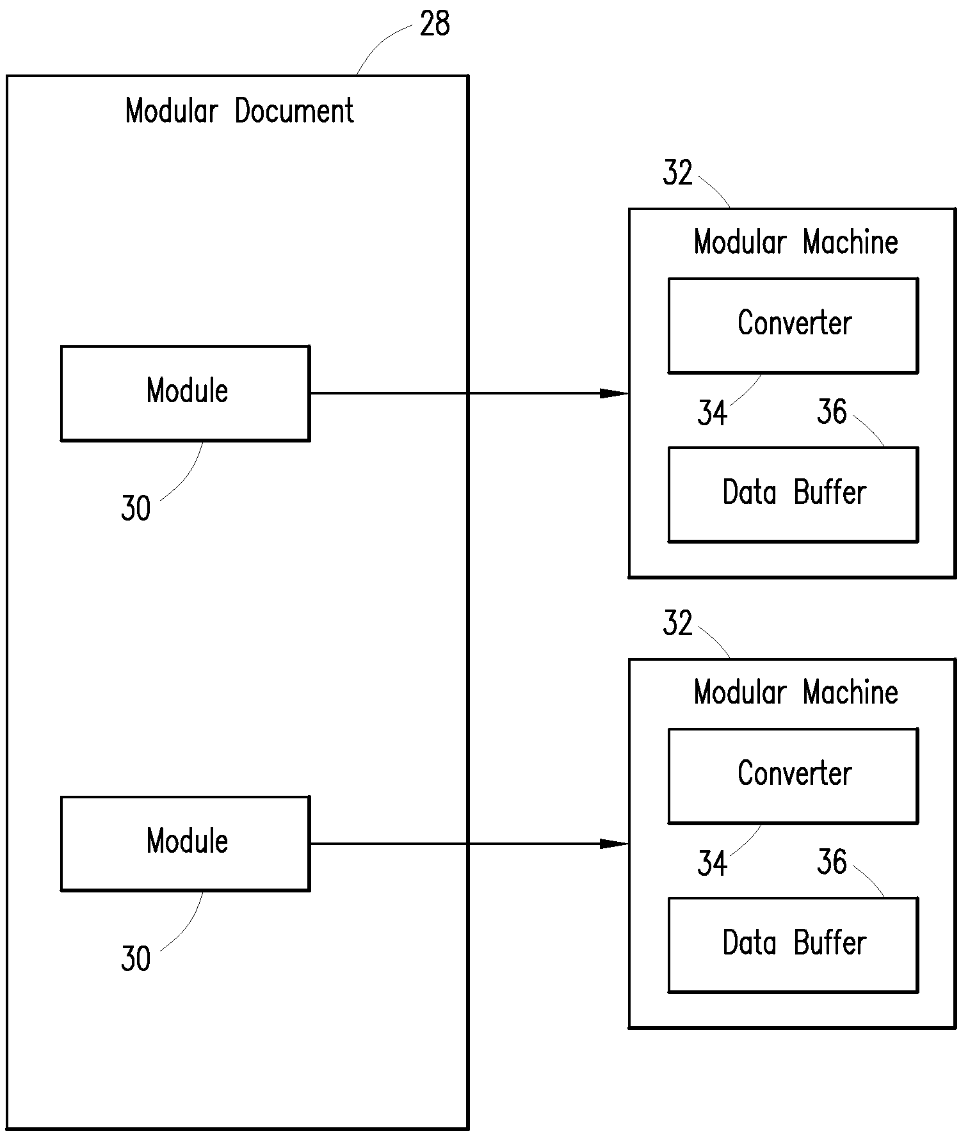
FIGS. 2A-2C are schematic block diagrams illustrating the conversion system (FIGS. 2A and 2B) according to the present invention and an exemplary modular document format (FIG. 2C)
Figure 2B:
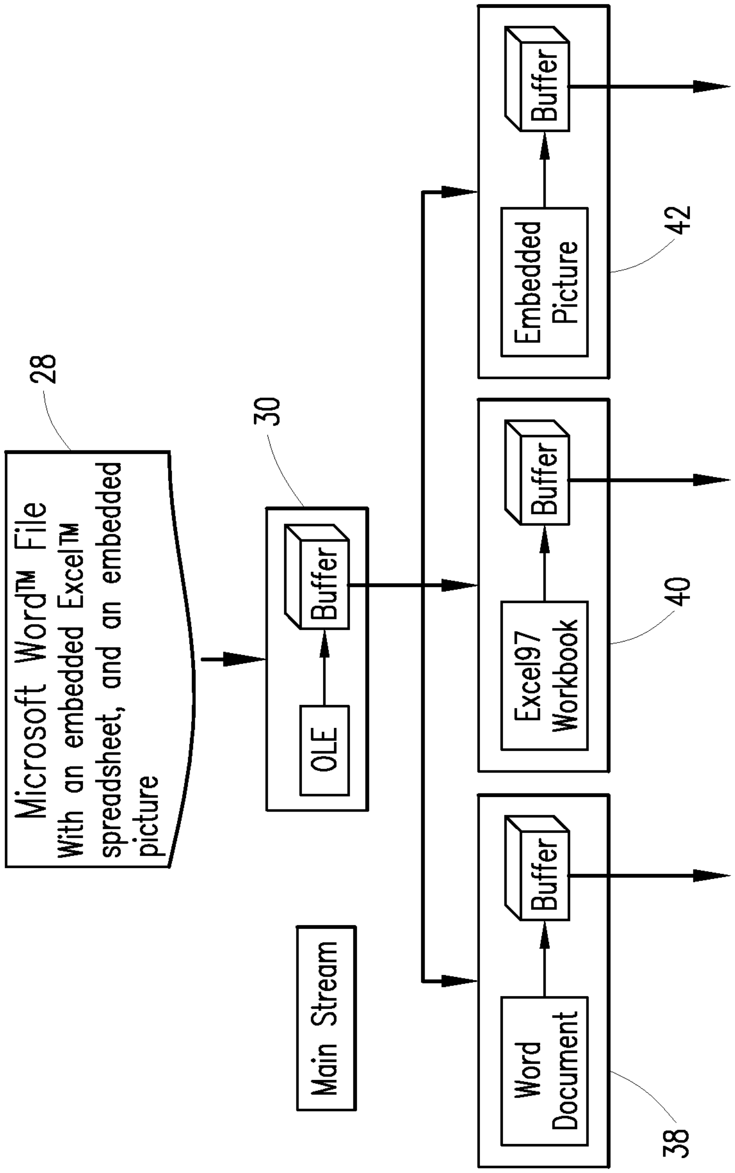
Figure 2C:
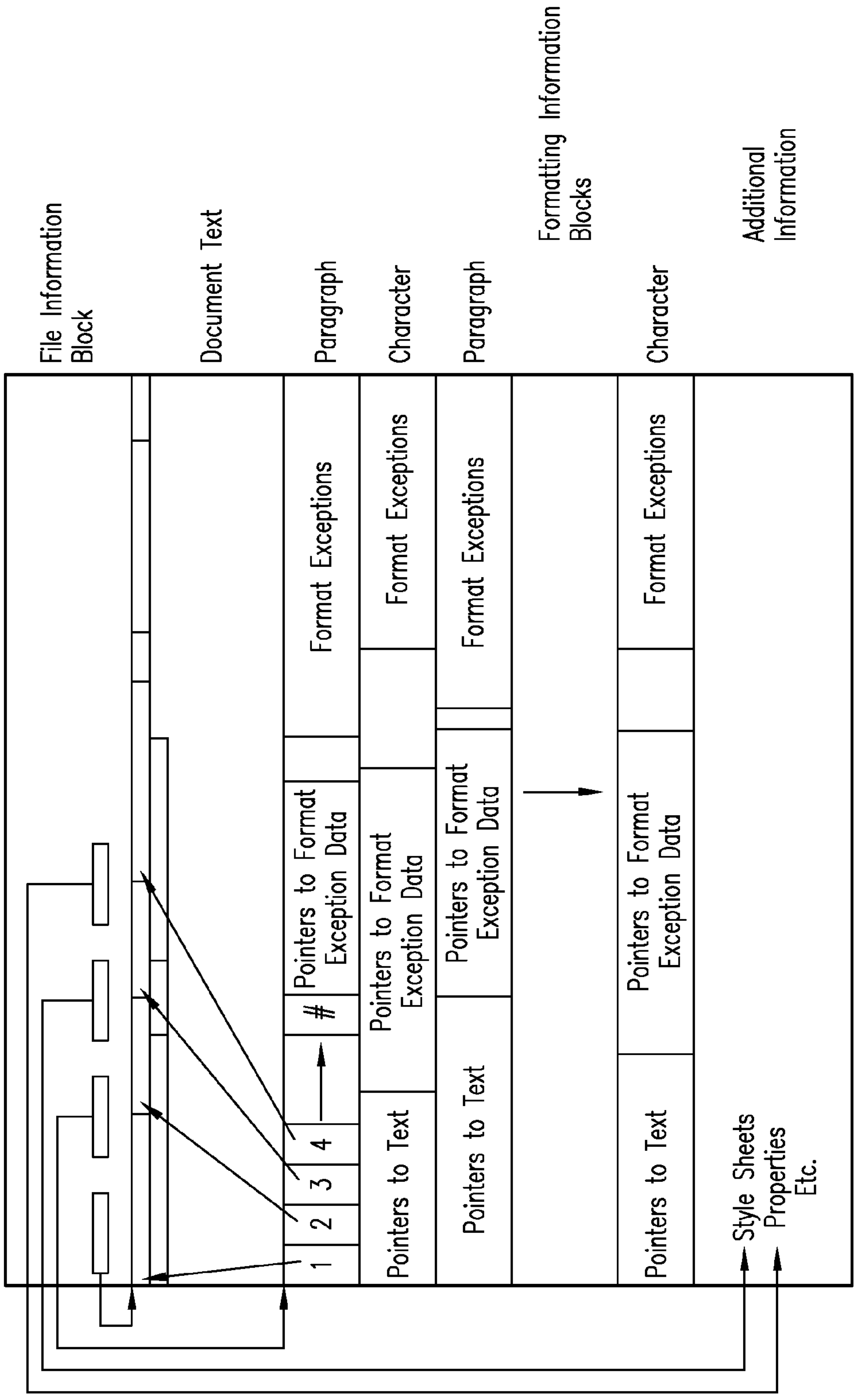
Figure 3:
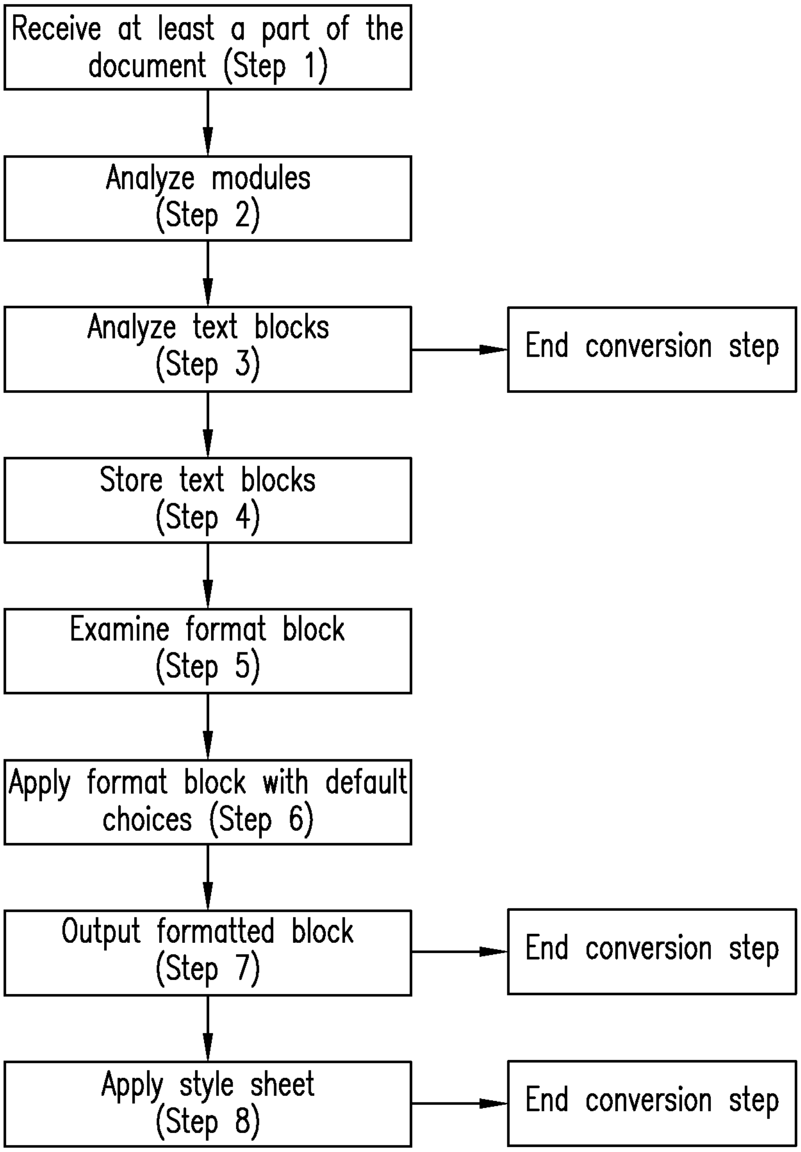
FIG. 3 is a flowchart of an exemplary method according to the present invention for converting a document in a streamed manner.

FIGS. 2A-2C and 3 are illustrations for the process of converting a document in a streamed manner. FIG. 2A is a schematic block diagram of a modular document in the system of the present invention, while FIG. 2B is an exemplary illustration of the modular document as a directed graph. FIG. 2C shows the basic structure of a Microsoft Word™ file, as an example of a modular file. FIG. 3 is a flowchart for a method for converting the modular document into a converted file format. The process of FIG. 3 could optionally be performed "off-line", before a specific user request for the document is received, or "on the fly", after such a request has been received.

FIG. 2A is a schematic block diagram of a modular document 28, which contains a plurality of modules 30. Each module 30 is analyzed and converted by a modular machine 32, which includes a converter 34 and a data buffer 36. Data buffer holds any data which is required for the operation of a subsequent modular machine 32, and is preferably identical for each modular machine 32.

Each modular machine 32 may optionally request specific information from one or more modular machines 32, such as information in a specified location in modular document 28 or information which is located in another, subsequent or previous, module 30. In addition, each modular machine 32 may then respond to one or more modular machines 32. Modular machine 32 from which the information is requested may optionally disregard such a request, or alternatively may decide to satisfy this request immediately. Preferably, modular machine 32 balances the satisfaction of the request against the requirement for optimized performance, for example with regard to answering requests sequentially, as opposed to a more efficient but non-sequentially performed group of responses. More preferably, modular machine 32 queues the incoming requests, for example by storing the requests in data buffer 36. Modular machine 32 may then optionally answer requests sequentially or non-sequentially.

Modular machine 32 may optionally and preferably be required to wait until the requested data is available before performing the next action in the process of conversion, although again, the requirement for waiting is more preferably balanced against optimization of the conversion process. For example, depending upon the structure of modular document 28, if modular machine 32 requires data from two other modular machines 32, but only receives data from one such modular machine 32, the requesting modular machine 32 may optionally be allowed to perform any action(s) which are possible with the current data, before waiting for the response to the other request.

Modular machine 32 may optionally and more preferably determine the type of module 30 for which information is supplied. The output of each modular machine 32 is optionally a generic file format, which is then more preferably rendered into a specific file format according to the profile user preferences and/or device capabilities. This generic output format is preferably XML. An example of a specific file format is a WML deck containing a WML card.

The flow of information and modular machines 32 may be shown, statically or dynamically, as a directed graph, as in FIG. 2B. In this example, document 28 is converted with a plurality of different types of modular machines 32. For the purposes of illustration only and without any intention of being limiting, these different types of modular machine 32 include Microsoft Word™ document modular machines 38, Microsoft Excel™ modular machines 40 and a graphic image modular machine 42. Within these different types of modular machines 32, the relationship between modules, according to which the data is analyzed and converted, is also different. For example, Microsoft Word™ modules are further divided into text modules and formatting modules. By contrast, Microsoft Excel™ modules do not have such different types, but these Microsoft Excel™ modules may optionally be arranged within the file in a non-sequential order. Both Microsoft Excel™ modules and the graphic image module are placed within document 28 according to particular locations, such that these modules also have a relationship to Microsoft Word™ modules.

As an example, the structure of Microsoft Word™ modular machines 32 may be described as follows, with regard to the main OLE stream in a Microsoft Word™ file. The main stream contains the majority of the information of a Word document. Additional streams contain summary information for a document and embedded OLE objects within the documents. Examples of such embedded objects include Microsoft Excel™ modules and the graphic image module as described with regard to FIG. 2B. It should be noted that this description relates to a non-complex Word™ document, which is a document saved using the full save function, as opposed to the quick save function.

As shown in FIG. 2C, a first type of module in the Microsoft Word™ file is a File Information Block, which is the first part of the file. This block contains pointers to most of the structures of the file, such as the blocks which are described in greater detail below.

Next, there are one or more modules containing the actual text of the document. Text can be stored in the Unicode character set. This section contains only basic formatting information (which is specified using special characters), such as spaces and tabs; paragraph structure, as determined by the end-of-paragraph character; page breaks; basic table information, such as cell end mark, and table row end mark; and special objects in the text (such as a date, a picture, line number and so forth). These special objects in the text must also be indicated in the Format Blocks, which are described below in greater detail.

The Format Blocks contain formatting information, which describes the properties of sections of text. Formatting information is basically stored in blocks of 512 bytes in the file. Each such block contains information about several continuous sequences of characters in the text, particularly with regard to any difference(s) from the parent Style to which these sequences belong. These blocks are divided into two types. This first type is a paragraph property block, which usually contains information such as justification, frame information, line spacing, paragraph structure and so forth.

The second type is a character property block, which usually contains information relevant to specific character blocks, such as text type (bold, italic, underlined, and so forth), size, font type and other such information.

Other optional information may include Style Sheet descriptions, Document properties and so forth, each of which is present in separate modules in the file, and are not specified in the Format Blocks.

FIG. 3 is a flowchart of an exemplary method according to the present invention for converting a Word™ document into a different file type, preferably XML as previously described, based upon the above description for the structure of such a document.

In step 1, at least a part of the document is received. In step 2, the modules of the document are analyzed, in order to separate these modules into the different types, as described in greater detail above. This step is preferably performed by first retrieving the File Information Block, and then analyzing this block in order to locate the remaining modules of the document, as this block contains pointers to the remaining blocks in the file.

In step 3, preferably all of the text blocks are analyzed in order to retrieve the text of the document. As described in greater detail above, the text blocks also contain simple format information, which is specified using special characters, such as spaces and tabs; paragraph structure, as determined by the end-of-paragraph character; page breaks; and basic table information, such as cell end mark, and table row end mark. This information is sufficient to enable the text to be correctly divided into paragraphs, and to show basic information regarding tables embedded within the text by using certain assumptions, for example that the first cell of the table contains a single paragraph.

The analysis of the document may optionally end at this step, for a text only conversion, in which almost all of the formatting information for the document is disregarded. In this embodiment, sections of the text are output for conversion, after basic formatting as previously described, such that the final conversion step is the conversion of the text to the generic file format such as XML for example. For conversion to XML, the minimal text formatting information which is available is easily converted directly to XML elements.

According to a second embodiment of the method, the analysis of the file continues after the text has been extracted, in order to obtain text with advanced formatting but without using Style information. In this embodiment, it is assumed that the Styles in the document are not changed from their default values. Therefore, each formatting information block is examined.

For the second embodiment, in step 4, the text section is stored rather than being converted. In step 5, each formatting information block is examined. Again, each such block can be located from the File information Block as previously described. As each formatting block is located for a particular text block, the changes specified in the formatting block are then applied to the relevant sections of text, based on the known default Style information, in step 6. In step 7, each formatted text section is output, such that steps 5-7 are optionally repeated at least once, and more preferably are repeated until the document has been fully analyzed. Again, the output sections are sent to the final conversion step, which again is the conversion of the text to the generic file format such as XML for example, and is similar to the previously described final conversion step, except that additional elements need to be added to incorporate the additional format information.

According to yet another embodiment of this method, the analysis of the file preferably continues, in order to produce converted text with full formatting, by using Style information. This embodiment may optionally be preferred if the modular machines support non-sequential data transference, which is supplying data from a specific location in the file, rather than converting only according to linear order. The Style Sheet information is then preferably requested in advance, based on its location which is stated in the File Information Block. Alternatively, such an embodiment may be supported for a full conversion, without regard to streaming considerations, for example for "off line" conversions.

According to this embodiment, the Style Sheet information is read before the text itself. Now, in step 8, changes are applied to the text as previously described from the Style Sheet information, as for the other formatting information. Again, this embodiment ends with the final conversion step, which again is the conversion of the text to the generic file format such as XML for example as previously described, except that further additional elements need to be added to incorporate the additional format information.

It should be noted that although the above description centers around visual data, the present invention is also applicable to audio data with at least one audio attribute. For example, an MP3 (MPEG layer 3) file includes stereo data, which is actually two mono channels or modules of data. The two mono channels can optionally be combined to a single mono channel, according to the relationship between these two channels, in order to form the converted file format data.

It will be appreciated that the above descriptions are intended only to serve as examples, and that many other embodiments are possible within the spirit and the scope of the present invention.

What is claimed is:

1. A method of providing a modular document for display on a wireless communication device, the method comprising:

receiving a request for the modular document from the wireless communication device for display thereon, the modular document comprising a plurality of text blocks and a plurality of format blocks;

requesting the document from a document server;

retrieving user preferences for display of at least a portion of the modular document on the wireless communication device;

receiving at a conversion server at least a part of the modular document requested for display on the wireless communication device, but less than a whole of the modular document;

prior to conversion, the conversion server examining the received part of the modular document to determine a relationship between the text blocks and the format blocks;

locating a set of blocks for conversion, the set of blocks comprising at least one text block and a format block inter-related with said text block;

converting the set of blocks into a converted streaming file format by the conversion server for display on the wireless communication device according to the user preferences; and transmitting the converted streaming file format to the wireless communication device for display thereon.

2. The method according to claim 1 wherein converting the modular document into a converted file format comprises:

locating the set of blocks for conversion and retrieving text from the at least one text block;

determining changes to the retrieved text according to the format block; and applying the determined changes to the retrieved text and converting said retrieved text into converted streaming file format comprising a linear sequence, wherein said determined changes are employed during conversion of said retrieved text as a result of an exchange of information between the inter-related blocks during conversion, wherein the changed text may be transmitted to the wireless communication device for display thereon without waiting for other parts of the modular document to be converted.

3. The method of claim 2, wherein applying the determined changes to the retrieved text further comprises:

(i) storing said text block at the conversion server before converting the retrieved text of said text block; and (ii) analyzing at least one format in said format block.

4. The method of claim 1, wherein said converting said retrieved text comprises converting to a first generic file format, and then converting said first generic file format to a specific streaming file format.

5. The method of claim 4, wherein said specific streaming file format is determined according to at least one preference of the user.

6. The method of claim 1, wherein the modular document comprises Object Linking and Embedding (OLE) file components.

7. The method of claim 6, wherein the modular document is a word processing document.

8. The method of claim 7, wherein the modular document comprises a spreadsheet component.

9. The method of claim 1, wherein said converted streaming file format is a mark-up language format.

10. The method of claim 1, wherein said mark-up language is WML (Wireless Mark-up Language), such that said wireless communication device is a WAP (wireless application protocol) enabled device.

11. A network node comprising:

a processor connected to a memory containing instructions that when executed by the processor perform the following:

receiving a request for a modular document from a wireless communication device for display thereon, the modular document characterized by a plurality of text blocks and a plurality of format blocks;

requesting the modular document from a document server;

retrieving user preferences for display of at least a portion of the modular document on the wireless communication device;

receiving at least a part of the modular document, but less than a whole of the modular document;

prior to conversion, examining the received part of the modular document to determine a relationship between the text blocks and the format blocks;

locating a set of blocks for conversion, the set of blocks comprising at least one text block and at least one format block inter-related with said text block;

converting the modular document into a converted streaming file format for display on the wireless communication device according to the user preferences; and transmitting the converted streaming file format to the wireless communication device for display thereon.

12. The network node according to claim 11 wherein converting the modular document into a converted streaming format comprises:

locating the set of blocks for conversion and retrieving text from the at least one text block;

determining changes to the retrieved text according to the format block; and applying the determined changes to the retrieved text and converting said retrieved text into converted streaming file format comprising a linear sequence, wherein said determined changes are employed during conversion of said retrieved text as a result of an exchange of information between the inter-related modules during conversion, wherein the changed text may be transmitted to the wireless communication device for display thereon without waiting for other parts of the modular document to be converted.

13. The network node according to claim 11, further comprising storing said text block of said received part of the modular document.

14. The network node according to claim 11, further comprising converting said retrieved text to a first generic file format, and then convert said first generic file format to a specific streaming file format.

15. The network node according to claim 11, wherein converting said retrieved text comprises converting to a first generic file format, and then converting said first generic file format to a specific streaming file format.

16. The network node according to claim 15, wherein said specific streaming file format is determined according to at least one preference of the user.

17. The network node according to claim 11, wherein the modular document comprises Object Linking and Embedding (OLE) file components.

18. The network node according to claim 17, wherein the modular document is a word processing document.

19. The network node according to claim 18, wherein the modular document comprises a spreadsheet component.

20. The network node according to claim 11, wherein said converted streaming file format is a mark-up language format.

* * * * *